No. 895,491. PATENTED AUG. 11, 1908.
F. NASH.
HYDRAULIC CLUTCH.
APPLICATION FILED MAR. 18, 1908.

2 SHEETS—SHEET 1.

Witnesses.
A. E. Ernst.
James W. Head.

Inventor.
Frederick Nash.
By T. Walter Fowler
his atty.

No. 895,491. PATENTED AUG. 11, 1908.
F. NASH.
HYDRAULIC CLUTCH.
APPLICATION FILED MAR. 18, 1908.
2 SHEETS—SHEET 2.
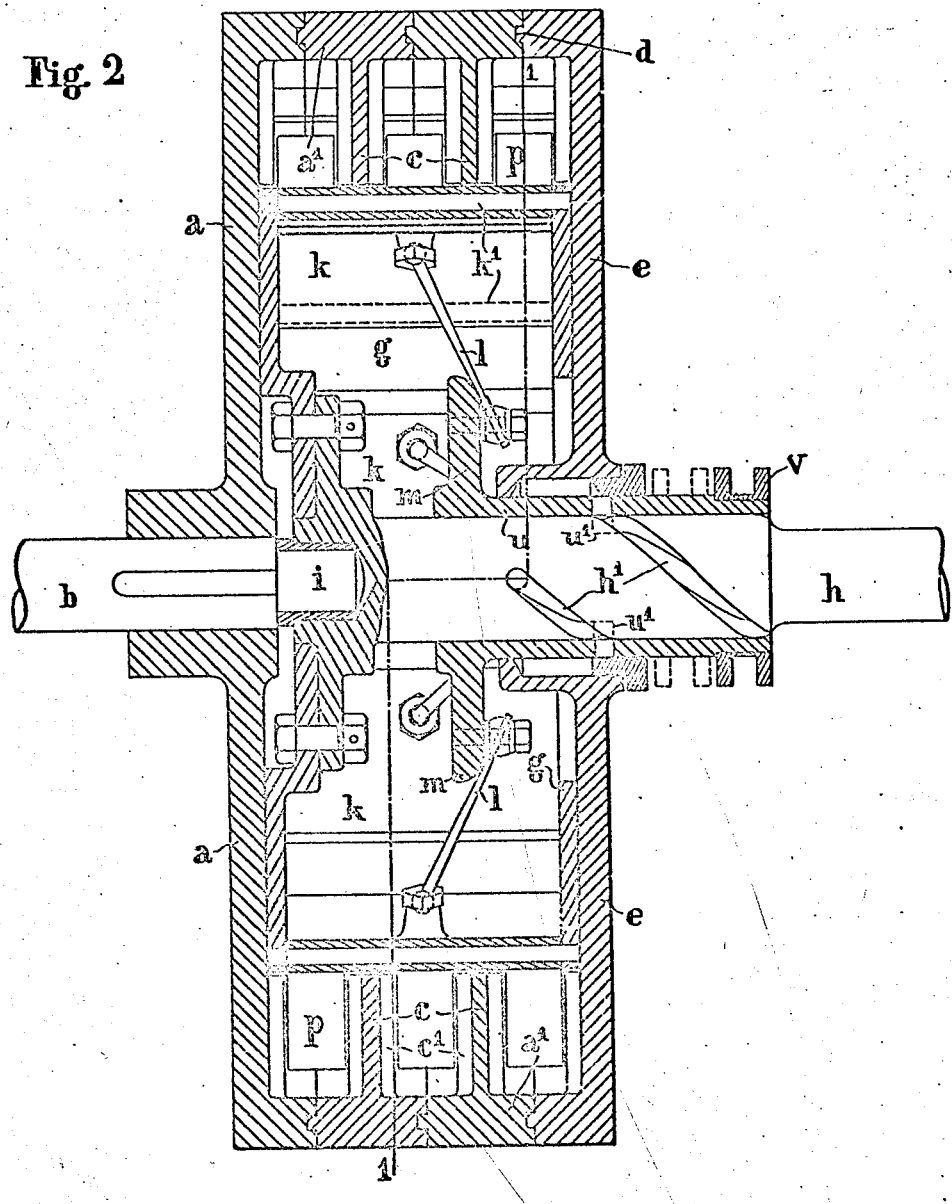
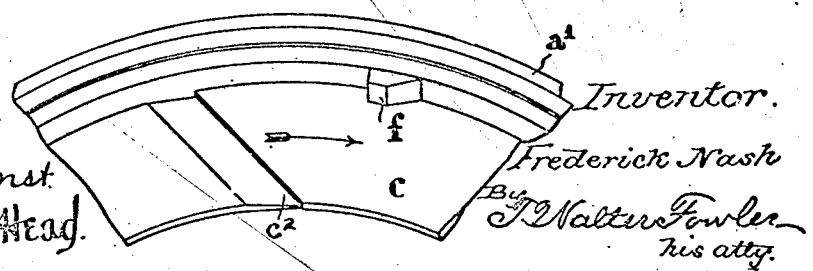
Witnesses
A. C. Ernst.
James W. Head.
Inventor.
Frederick Nash
By T. Walter Fowler
his atty.

UNITED STATES PATENT OFFICE.

FREDERICK NASH, OF LONDON, ENGLAND.

HYDRAULIC CLUTCH.

No. 895,491.

Specification of Letters Patent.

Patented Aug. 11, 1908.

Application filed March 18, 1908. Serial No. 421,959.

*To all whom it may concern:*

Be it known that I, FREDERICK NASH, a subject of the King of England, and residing at 65 Lancaster road, South Hampstead, London, England, no occupation, have invented a certain new and useful Improvement in Hydraulic Clutches, of which the following is a full, clear, and exact description, and for which I have applied for Letters Patent in Great Britain, No. 21,275 of 1907, filed and dated September 25, 1907.

This invention relates to improvements in hydraulic clutches and is particularly adapted for use with the explosion-engines of automobiles.

The invention is of the type which employs two concentric members between which an annular chamber is provided for the oil or other liquid. In such clutches it has been proposed to obstruct to a variable degree the passage of oil around this chamber by means of pivoted flaps or radially sliding blades which may be raised from one or other of the clutch members so as to restrict or prevent the circulation of oil.

According to the present invention, the chamber is sub-divided into a number of parallel sections by means of annular rings projecting inwardly from the flywheel, and the pivoted flaps or the like are provided with segments of similar rings. Thus as the flaps are forced outwardly towards the full driving position, the segments which they carry will enter the grooves lying between the rings on the outer chamber, and so obstruct the passage of liquid. Owing to the constrictive effect of the narrow grooves and the greater area in contact with the liquid, the torque transmitted by the clutch is much more powerful than in a similar clutch of the ordinary construction referred to above, and the increase of force transmitted as the flaps are raised takes place in a more regular manner. The flaps may be controlled in any convenient manner as for instance by a corresponding number of rods sliding radially in suitable guides and connected by links to an operating collar movable upon the shaft. The segments are preferably made integral with the flaps to insure rigidity.

The invention is hereafter described with reference to the accompanying drawings in which:—

Figure 1:
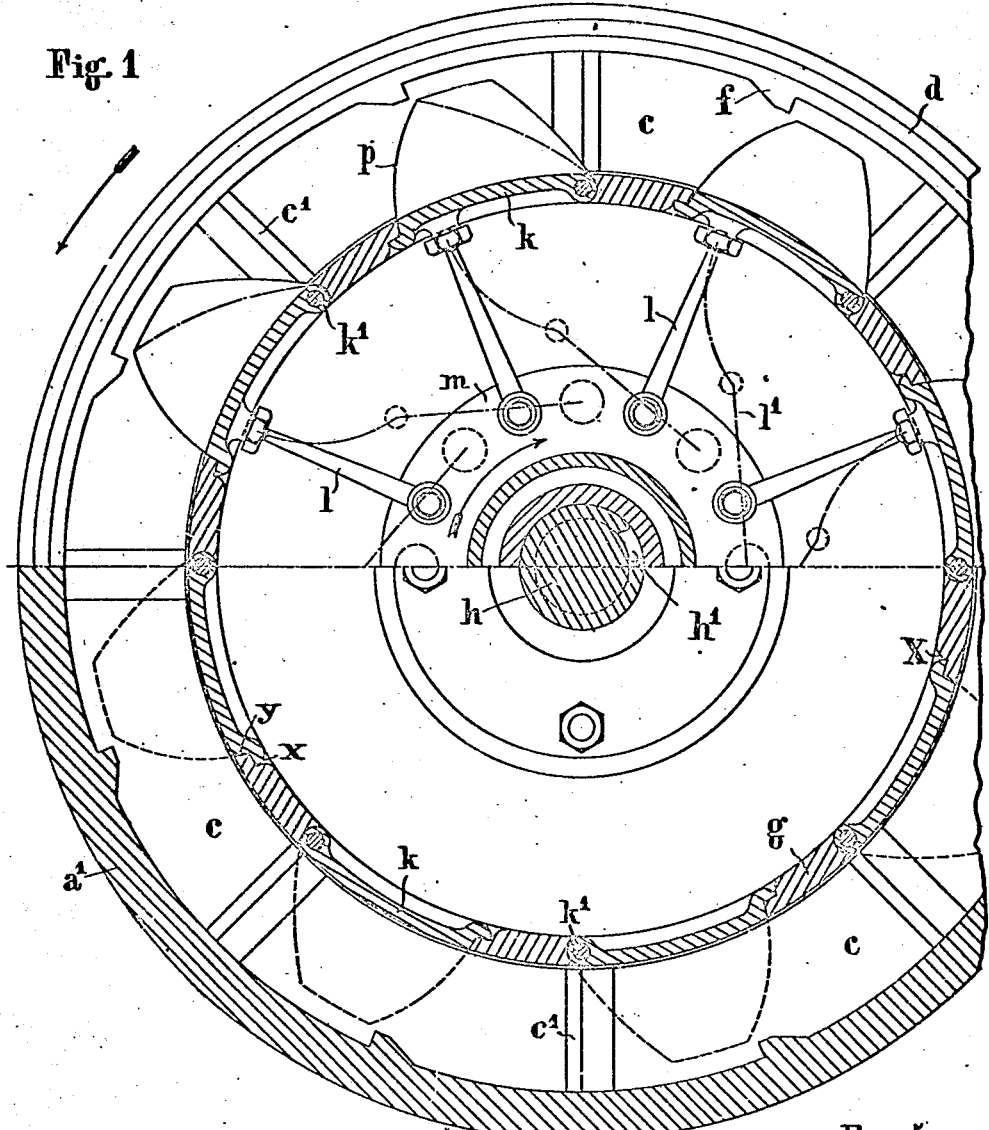
Figure 3:
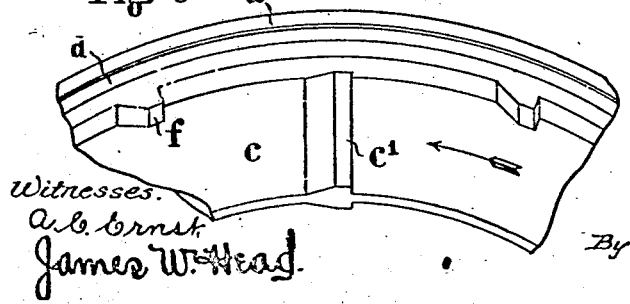
Figure 5:
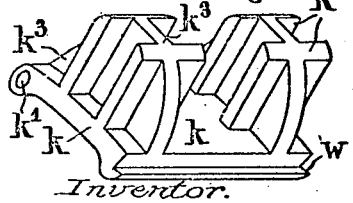

Figure 1 is an elevation of the improved clutch, in section on line 1—1 of Fig. 2. Fig. 2 is a central section along the shaft. Fig. 3 is a detail of a portion of one of the ring sections of the flywheel. Fig. 4 is a similar view of a modification. Fig. 5 represents a special form of pivoted flap.

The flywheel $a$ is mounted on the driving shaft $b$ and has a number of projecting rings $c$ upon its internal periphery dividing the annular chamber into cellular compartments. The flywheel may be built up as shown with a number of rings $c$ each carrying a portion $a'$ of the rim of the flywheel, the elements being thus of T section. A concentric groove $d$ is cut around the edge of the part $a'$ and engaged by a corresponding lip or fillet upon the adjoining edge. Any desired number of these elements may be thus attached to the flywheel plate $a$; a second end plate shown at $e$ is similarly fitted to the other end and the whole bolted securely together. Any other method of constructing the flywheel may however be employed.

The annular rings $c$ may have wedge-shaped projections $c'$ upon either side as shown in Fig. 3, so disposed as to force the liquid away from the ring $c$ as the latter passes through it in the direction indicated. Alternatively the ring may have similarly tapered recesses $c^2$ upon either side, and these recesses or the before mentioned projections may be placed obliquely as in Fig. 4, so tending to throw the liquid towards the center.

Around the periphery of the flywheel are spaced a number of cross bars $f$. These may also be tapered in section so as to throw the liquid towards the inner portions of the annular cells and so prevent leakage past the tips of the flaps or blades.

The inner member or clutch $g$ is mounted upon the driven shaft $h$ and is shown guided by a spigot $i$ central of the flywheel. Flaps $k$ are pivoted at $k'$ upon this clutch and are controlled by suitable operative rods here shown as links $l$. The pivots $k'$ of the flaps are shown disposed slightly radially inwards of the periphery of $g$. These links are attached to a disk $m$ formed upon a sleeve $u$ which may be slid along the shaft $h$ by means of a collar $v$ or the like. The sleeve $u$ is provided with inwardly projecting pins or keys $u'$ fitting in spiral keyways $h'$ cut in the shaft $h$ and forming a quickpitch screw, whereby the sliding movement imparted to the collar, will rotate the sleeve $u$ in relation to the shaft. This rotary movement of the sleeve $u$ and disk $m$ as represented by the arrow in Fig. 1 causes the links $l$ to move into the position $l'$ shown in dotted lines, so swinging the flaps $k$ around their pivots $k'$.

The flaps $k$ carry segments $p$ adapted to fit within the cells into which the rings $c$ divide the annular chamber, so as to obstruct the passage of liquid therein. As the links $l$ are brought by the sliding movement of the collar into the position indicated by dotted lines, the segments $p$ are withdrawn into the clutch $g$ and leave the liquid free space for circulation. When the extreme position is reached, the segments are wholly within the clutch and the resistance offered to the liquid is a minimum; this constitutes the free position of the clutch. When however the segments are pushed outwards to the position shown in the drawing, the resistance is a maximum; this constitutes the driving position. The segments $p$ may be given any desired shape; for instance, they may be of the form shown by full lines in Fig. 1 or they may be made of approximately triangular shape by rounding off one outer corner as indicated by dotted lines in said figure.

In Fig. 5 I have shown a flap suitable for a clutch in which the annular chamber is divided into two cells. This flap has duplicated blades $k^2$, connected by ribs $k^3$, the blades and ribs being exposed to the current of liquid as the flap $k$ is pushed outwards by the link $l$. In this view the flap $k$ is provided with a lip $w$ to engage a cut away portion $x$ in the recess $y$ in the periphery of $g$.

The segments upon the pivoted flaps are preferably of a thickness tapering against the movement of the liquid, their shape thus being analogous to that of the projection $c'$ so as to direct the liquid against the annular rings on either side as it passes the wedge-shaped segments. The annular rings upon the flywheel may be made with a number of similar wedges at suitable intervals: For instance the ring may comprise equal numbers of sections of tapering and of uniform thickness so that the circumference is evenly divided between the two kinds.

The rings upon the flywheel may have a slightly rough surface either in parts or entirely, in order to increase the grip of the liquid. This may be provided by leaving the corresponding parts unmachined or only roughly turned, it being however understood that the rings are rendered perfectly true in their revolution.

Having thus described my invention what I claim as such and desire to secure by Letters Patent is:—

1. A hydraulic clutch comprising an outer containing member, an inner member concentric therewith, an annular chamber for liquid between said concentric members, said members being mounted one on the driving shaft and the other on the driven shaft, flaps mounted on the inner member and pivoted thereto, annular rings upon the internal periphery of the outer member, said rings affording annular cells in the chamber between the concentric members, said flaps carrying segments adapted to fit said cells, and means for causing the pivoted flaps to obstruct the passage of liquid through said cells to a variable degree by means of the segments carried on said flaps.

2. A hydraulic clutch comprising an outer containing member, an inner member concentric therewith, an annular chamber for liquid between said concentric members, said members being mounted one on the driving shaft and the other on the driven shaft, flaps mounted on the inner member and pivoted thereto, annular rings upon the inner periphery of the outer concentric member, said rings affording annular cells in said chamber, wedge-shape projections upon the side of the rings to force the liquid away from the latter, said flaps being seated in the inner member and carrying segments adapted to pass between said annular rings, and means for causing said pivoted flaps to project their segments to a variable extent across the annular chamber.

3. A hydraulic clutch comprising an outer containing member, an inner member concentric therewith, an annular chamber for liquid between said concentric members, said members being mounted one on the driving shaft and the other on the driven shaft, flaps mounted on the inner member and pivoted thereto, annular rings provided upon the internal periphery of the outer member, said rings affording annular cells in said chamber, said flaps carrying segments adapted to fit between said rings, means provided on the walls of said annular chambers to force the liquid towards the centers of the cells and means for causing the segments to project across the annular chamber to a variable extent.

4. A hydraulic clutch comprising an outer containing member, an inner member concentric therewith, an annular chamber for liquid between said concentric members, said members being mounted one on the driving shaft and the other on the driven shaft, flaps mounted on the inner member and pivoted thereto, said outer chamber consisting of parallel T-section elements filleted together and having inwardly projecting rings dividing the chamber into cells, end plates to hold said elements of the outer member together, said flaps carrying segments adapted to engage between said rings, and means for actuating the flaps.

5. A hydraulic clutch comprising an outer containing member, an inner member concentric therewith, an annular chamber for liquid between said concentric members, said members being mounted one on the driving shaft and the other on the driven shaft, flaps mounted on the inner member and pivoted thereto, annular rings upon the internal periphery of the outer member, devices upon the side of said rings to throw the liquid towards the center, said flaps being pivoted below the outer periphery of the inner member and having attachments and means whereby said attachments can be caused to obstruct the annular chamber to a variable extent.

6. A hydraulic clutch comprising an outer containing member, an inner member concentric therewith, an annular chamber for liquid between said concentric members, said members being mounted one on the driving shaft and the other on the driven shaft, flaps mounted on the inner member and pivoted thereto, cross bars upon the inner periphery of the outer chamber, annular rings upon the said inner periphery, said flaps being hinged within the outer periphery of the inner member and carrying segments adapted to fit in the annular cells formed between said rings, and means for actuating and controlling the pivoted flaps.

7. A hydraulic clutch comprising an outer containing member, an inner member concentric therewith, an annular chamber for liquid between said concentric members, said members being mounted one on the driving shaft and the other on the driven shaft, flaps mounted on the inner member and pivoted thereto, said pivots for the hinged flaps being inside of the periphery of the inner member, segments mounted upon the pivoted flaps, means for actuating said flaps and causing their segments to obstruct the annular chamber to a variable extent, and annular rings upon the inner periphery of said outer member, said segments fitting between said rings.

8. A hydraulic clutch comprising an outer containing member, an inner member concentric therewith, an annular chamber for liquid between said concentric members, said members being mounted one on the driving shaft and the other on the driven shaft, flaps mounted on the inner member and pivoted thereto, said pivots for the hinged flaps being radially inwards of the outer periphery of the inner member, segments carried by said flaps and capable of projecting into the annular chamber aforesaid, means for actuating said flaps and means for preventing the passage of said flaps beyond the outer periphery of the inner member.

9. In a hydraulic clutch, a flap adapted to be hinged to one of the members and comprising segments upstanding on said flap, ribs upon said segments, and a lip upon said flap to prevent the flap from passing beyond the periphery of the clutch member to which it is hinged.

10. In a hydraulic clutch of the type described, the combination with annular rings upon the inner periphery of the outer member, of movable flaps hinged in the inner member and carrying segments with transverse ribs said ribs fitting in the annular cells between said rings in the chamber between said clutch members.

11. In a hydraulic clutch, the combination of flaps hinged to one of the clutch members, upstanding segments mounted on said flaps, operative links pivoted at one end to said flaps and at the other end pivoted to a common disk member, said disk mounted on a sleeve slidable along a shaft, spiral keyways formed in said shaft and keys projecting from said sleeve into said keyways, so that sliding movement imparted to the sleeve will rotate the disk and actuate the hinged flaps.

12. A hydraulic clutch, comprising an outer containing member, an inner member concentric therewith, said members mounted on separate shafts, so as to leave an annular chamber for liquid between said members, recesses in the periphery of said inner member, flaps pivoted at one end in said recesses in said inner member, means for preventing said flaps from rising out of said member, segments carried by said flaps and transverse ribs mounted on said flaps so that said segments and ribs may project into said annular chamber, and between annular rings from the inner periphery of said outer member, and means for actuating and controlling the position of said flaps, segments and ribs.

13. A hydraulic clutch, comprising an outer containing member, an inner member concentric therewith, said members mounted on separate shafts so as to leave an annular chamber for liquid between said members, recesses in the periphery of said inner member, flaps pivoted at one end in said recesses in said inner member, a lip upon the free ends of said flaps to engage a stop in the recesses of said inner member, segments and ribs upon the outer face of said flaps, annular rings from the inner periphery of said outer member between which said blades may pass, and means for thrusting outwardly said flaps so that the segments and ribs coöperate with the annular rings aforesaid.

14. A hydraulic clutch, comprising an outer member, an inner member concentric therewith, said members being mounted on shafts and affording an annular chamber for liquid, cross bars and annular rings upon the inner periphery of the outer member, flaps hinged in recesses in the inner member, segments upon said flaps adapted to engage said rings, said outer member inclosing said inner member in the form of a drum having end plates, and means for actuating and controlling said flaps and blades from without said drum.

15. A hydraulic clutch, comprising an outer incasing member consisting of a flywheel with end-plates, an inner member disposed concentrically within said outer member and fitting within said end-plates, an annular space or chamber for liquid between said members, annular rings from the inner periphery of said outer member, flaps hinged in recesses in the outer periphery of said inner member, segmental plates and transverse ribs mounted upon said hinged flaps adapted to project into said annular chamber when desired, said segments and ribs fitting between said rings and means for varying the position of said flaps and the devices carried thereby from outside the clutch, so that said annular chamber is divided into a number of annular cells, the passage of liquid through which may be obstructed by the segments and ribs upon the flaps.

16. A hydraulic clutch, comprising an outer incasing member consisting of a flywheel with end-plates, an inner member disposed concentrically within said outer member and fitting within said end-plates, an annular space or chamber for liquid between said members, annular rings from the inner periphery of said outer members, flaps hinged in recesses in the outer periphery of said inner member, segmental plates and transverse ribs mounted upon said hinged flaps adapted to project into said annular chamber when desired, said segments and ribs fitting between said rings and links from the inner side of said flaps to a rotatable device in the clutch operated from outside the clutch, so that the projection of the plates and ribs on said flaps into the annular chamber may be varied as desired.

17. A hydraulic clutch, comprising an outer incasing member consisting of a flywheel with end-plates, an inner member disposed concentrically within said outer member and fitting within said end-plates, an annular space or chamber for liquid between said members, annular rings from the inner periphery of said outer member, flaps hinged in recesses in the outer periphery of said inner member, segmental plates and transverse ribs mounted upon said hinged flaps adapted to project into said annular chamber when desired, said segments and ribs fitting between said rings, said members being mounted on separate co-axial shafts, a spigot joint between said shafts, and means for varying from outside the clutch the position of said flaps and the upstanding devices thereon.

18. A hydraulic clutch, comprising an outer incasing member consisting of a flywheel with end-plates, an inner member disposed concentrically within said outer member and fitting within said end-plates, an annular space or chamber for liquid between said members, annular rings from the inner periphery of said outer member, flaps hinged in recesses in the outer periphery of said inner member, segmental plates and transverse ribs mounted upon said hinged flaps adapted to project into said annular chamber when desired, said segments and ribs fitting between said rings, said members being mounted on separate co-axial shafts, a spigot joint between said shafts, operative links pivoted to the inner faces of said flaps and to an annular disk-member mounted within the inner clutch, said disk-member secured to a sleeve slidable upon one of the clutch-member shafts, spiral keyways formed in such shaft and keys projecting from said sleeve into said keyways, so that sliding movement imparted to the sleeve will rotate the disk member and actuate the hinged flaps.

In witness whereof I have hereunto set my hand in presence of two witnesses.

FREDERICK NASH.

Witnesses:
VICTOR F. FEENY,
H. D. JAMESON.